Patented Dec. 30, 1924.

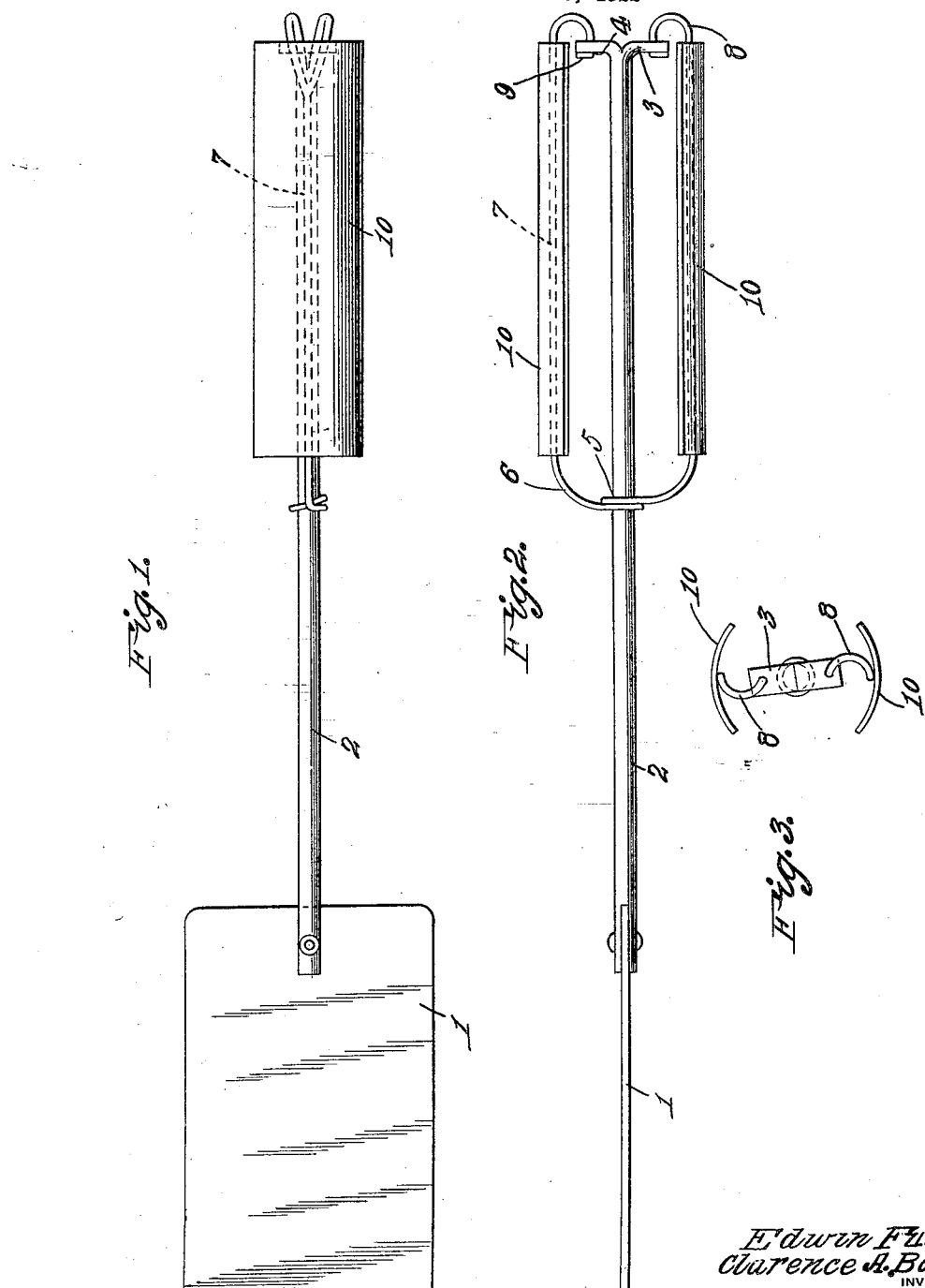

1,521,525

UNITED STATES PATENT OFFICE.

EDWIN FULTS AND CLARENCE A. BATES, OF CANASTOTA, NEW YORK.

CAKE TURNER.

Application filed December 20, 1922. Serial No. 608,052.

*To all whom it may concern:*

Be it known that we, EDWIN FULTS and CLARENCE A. BATES, citizens of the United States, residing at Canastota, in the county of Madison and State of New York, have invented new and useful Improvements in Cake Turners, of which the following is a specification.

The object of our said invention is the provision of a simple, durable and reliable cake turner of the type in which turning of the blade of the turner and a cake thereon is brought about by compression of the handle of the turner.

To the attainment of the foregoing, the invention consists in the improvement as hereinafter described and definitely claimed.

In the accompanying drawings, forming part of this specification:—

Figure 1 is an elevation of our improved cake turner.

Figure 2 is an elevation taken at right angles to Figure 1.

Figure 3 is a rear end elevation of the turner.

Similar numerals of reference designate corresponding parts in all of the views of the drawings.

Among other elements our novel cake turner comprises a thin and flat blade 1 to the heel portion of which is appropriately fixed a shank 2 of circular form in cross-section. At its rear end the said shank 2 is provided with a T-head 3 which for the sake of economy in manufacture is formed as best shown in Figure 2 integral with the shank 2. In the oppositely directed portions of the said T-head 3 are longitudinally disposed apertures 4.

Coiled about the shank 2 or otherwise revolubly mounted thereon as designated by 5 is the forward bight portion of a loop-shaped spring 6, preferably of heavy wire. In addition to the said forward bight portion the loop-shaped spring 6 comprises rearwardly extending longitudinal stretches 7 in parallelism and arms 8 at the rear ends of the said stretches 7, the said arms 8 being journaled in the said apertures 4 of the shank head 3 and being held to the said head 3 through the medium of the bent portions 9.

Appropriately attached to the stretches 7 of the loop-shaped spring 6 are concavo-convex plates 10 which are preferably of sheet metal though they may be made of any other appropriate material and are adapted to form handle portions.

In the practical operation of our novel cake turner the blade 1 is placed under a cake and is raised with the cake a proper distance above the pan whereupon the handle is compressed by the movement of the two handle portions 10 toward each other whereupon in virtue of the head 3 of the shank 2 being disposed at an angle to the plane of movement of the handle portions, the shank 2 will be caused to turn in the spring 6, and the cake will be dropped upside down on the pan or griddle.

It will be apparent from the foregoing that our novel cake turner is simple and inexpensive in construction and reliable in operation and free of delicate parts such as are likely to get out of order after a short period of use; and it will also be apparent that the disposition of the T-head 3 at an angle to the line of movement of the handle portions 10 is due in a measure to the reverse curvature of the loop 8 as clearly shown in Figure 3 which contributes to the simplicity and efficiency of the device.

We have entered into a detailed description of the construction and relative arrangement of the parts embraced in the present and preferred embodiment of our invention in order to impart a full, clear and exact understanding of the said embodiment. We do not, desire, however, to be understood as confining ourselves to the specific construction and relative arrangement of parts inasmuch as in the future practice of the invention various changes and modifications may be made such as fall within the scope of our invention as defined in our appended claim.

Having described our invention, what we claim and desire to secure by Letters-Patent, is:—

A pan cake turner comprising a thin flat blade, a shank fixed to the heel portion of the blade and extending rearwardly therefrom and terminating at its rear end in a T-head in the oppositely directed portions of which are longitudinally disposed apertures, a loop-shaped spring having a forward bight portion rotatable about the shank and also having rearwardly directed longitudinal stretches in parallelism and spaced at opposite sides of the shank and loops at the rear ends of the said stretches and journaled and retained in the apertures of the T-head, and handle portions attached to the said longitudinal stretches of the spring; the said rear loops of the spring being reversely curved, and the said T-head on the shank being disposed at an angle to the line of movement of the handle portions.

In testimony whereof we affix our signatures.

EDWIN FULTS.
CLARENCE A. BATES.